Patented Jan. 5, 1943

2,307,090

UNITED STATES PATENT OFFICE 2,307,090

STABILIZED VINYL RESINS

Victor Yngve, Lakewood, Ohio, assignor to Carbide and Carbon Chemicals Corporation, a corporation of New York No Drawing. Application December 16, 1939, Serial No. 309,573

9 Claims. (Cl. 260—86)

The invention relates to stabilized vinyl resins and compositions containing them. It is particularly concerned with new and improved stabilizing materials which show definite advantages in preventing deterioration of vinyl resin compositions at elevated temperatures.

As synthetic resinous bodies, vinyl resins are well known in the art, and their valuable properties as components of plastic compositions of various sorts have been recognized. In the compounding and processing of such resins into molded and extruded articles, as well as in coating compositions which require baking, it is necessary to subject the plastics to a certain amount of heating. Under such conditions, and at elevated temperatures which may be encountered in normal usage, a tendency toward deterioration commonly occurs. To prevent such decomposition, it has, therefore, been considered essential with known types of vinyl resin to incorporate therewith additive materials adapted to exert a stabilizing action, and numerous compounds have been suggested for this purpose.

Improvements afforded by this invention are especially applicable to vinyl resins of the type produced by the more or less complete polymerization of a vinyl halide, such as vinyl chloride, or by the conjoint polymerization of mixtures of vinyl halides with vinyl esters of aliphatic acids. Resins of the latter type are described in U. S. Patent 1,935,577 to E. W. Reid, and among these, the conjointly polymerized product of vinyl chloride and vinyl acetate containing about 60% to 95% of vinyl chloride in the polymer, and having an average molecular weight of from about 5,000 to 20,000, as estimated from the specific viscosity of dilute solutions according to Staudinger's method, is especially susceptible to stabilization by the compounds hereinafter described.

I have found that the organo-metallic compounds of lead notably the organo-metallic lead salts of carboxylic acids containing not more than eight carbon atoms and particularly the lower fatty acid salts of both alkyl and aryl derivatives of this metal, will function as excellent stabilizers for vinyl resins, and when intimately dispersed therein will provide plastic compositions of substantially improved resistance to heat deterioration. Preferably the carboxylic acid radical in the salt is that of a monobasic acid containing not more than eight carbon atoms, as represented by acetic, propionic, butyric, or valeric acids, and the alkyl radical contains three or more carbon atoms, as included in the propyl, isopropyl, butyl, isobutyl, tertiary butyl, and the various amyl groups. As aryl derivatives those containing phenyl, tolyl, xylyl and naphthyl groups are typical, or a mixed hydrocarbon grouping in the compound is also appropriate. The dibutyl lead salts of the carboxylic acids containing less than four carbon atoms, in particular acetic and propionic acids, are especially effective in vinyl resin compositions for coating purposes, and the basic salts, as well as the normal salts, are excellent stabilizers.

The important and valuable properties in these new stabilizers include the fact that in concentrations necessary to obtain suitable stability they impart no color to a resin composition, and can thus be used satisfactorily in either transparent or ordinary white films. The compounds furthermore have very little, if any, adverse effect on the water resistance of thin films, presenting a combination of properties quite unique among stabilizers suitable for use with vinyl resins. Another advantage resides in the resistance of the stabilizers to discoloration in the presence of hydrogen sulfide, which makes possible the satisfactory application of vinyl resin plastics to uses requiring contact with sulfur compounds.

The amounts of stabilizer necessary to effect desirable heat stability is within the range heretofore found suitable with other materials, varying usually from about 0.5% to about 5.0% by weight of the vinyl resin. In coating compositions the compatibility of the stabilizer with the resin must also be considered.

In compounding the stabilizer with the resin, methods heretofore known may be employed which will effect an intimate dispersion throughout the resin mass. Solvents suitable for the resins formed by conjointly polymerizing vinyl chloride with vinyl acetate will dissolve some of these new stabilizers, and with these, no milling is necessary to obtain their suitable dispersion in preparing a lacquer formula. For various plastic compositions there may be included any of the common solvents, plasticizers, pigments, and other modifying materials without detrimental effect upon the heat stability afforded by these new stabilizers.

Modifications within the scope of the appended claims will be evident, and are intended to be included within the invention as defined therein. This application contains subject-matter in common with, and is a continuation-in-part of, my copending application Serial No. 118,568, filed December 31, 1936, now Patent 2,219,463. Subject-matter once claimed in this application is now claimed in my continuation-in-part application Serial No. 365,008 filed November 9, 1940.

I claim:

1. A vinyl resin composition including a polymerized vinyl halide stabilized against thermal decomposition by the addition to the resin in intimate dispersion of an organo-metallic lead salt of an aliphatic carboxylic acid containing not more than eight carbon atoms.

2. A vinyl resin composition including a polymerized vinyl halide stabilized against thermal decomposition by the addition to the resin in intimate dispersion of an organo-metallic lead salt of a fatty acid containing not more than eight carbon atoms.

3. A vinyl resin composition including a polymerized vinyl halide stabilized against thermal decomposition by the addition to the resin in intimate dispersion of an alkyl lead salt of an aliphatic carboxylic acid containing not more than eight carbon atoms.

4. A thermally stable vinyl resin composition including a polymerized vinyl halide containing intimately dispersed therein an aryl lead salt of an aliphatic carboxylic acid containing not more than eight carbon atoms.

5. A thermally stable vinyl resin composition including a polymerized vinyl halide containing intimately dispersed therein a dialkyl lead salt of an aliphatic carboxylic acid containing not more than eight carbon atoms.

6. A thermally stable vinyl resin composition including a polymerized vinyl halide containing intimately dispersed therein a dibutyl lead salt of an aliphatic carboxylic acid containing less than four carbon atoms.

7. A thermally stable vinyl resin composition including a polymerized vinyl halide containing intimately dispersed therein a diphenyl lead salt of an aliphatic carboxylic acid containing less than four carbon atoms.

8. A vinyl resin composition comprising a vinyl resin, substantially identical with that formed by the conjoint polymerization of a vinyl halide with a vinyl ester of an aliphatic acid, stabilized against thermal decomposition by the addition to the conjoint polymer resin in intimate dispersion of an alkyl lead salt of a fatty acid containing not more than eight carbon atoms.

9. A thermally stable vinyl resin composition comprising a vinyl resin, substantially identical with that formed by the conjoint polymerization of a vinyl halide with a vinyl ester of an aliphatic acid, and a stabilizing material intimately dispersed therein comprising an aryl lead salt of a fatty acid containing not more than eight carbon atoms.

VICTOR YNGVE.